No. 683,284. Patented Sept. 24, 1901.
A. A. HONEY.
ELECTROMAGNETIC BRAKE.
(Application filed Nov. 22, 1900.)

(No Model.)

Witnesses
Inventor
Albert A. Honey
Attorneys

United States Patent Office.

ALBERT A. HONEY, OF TACOMA, WASHINGTON.

ELECTROMAGNETIC BRAKE.

SPECIFICATION forming part of Letters Patent No. 683,284, dated September 24, 1901.

Application filed November 22, 1900. Serial No. 37,328. (No model.)

*To all whom it may concern:*

Be it known that I, ALBERT A. HONEY, a citizen of the United States, residing at Tacoma, in the county of Pierce and State of Washington, have invented certain new and useful improvements in electromagnetic brakes for application to the wheels of railway-cars, locomotives, street-cars, and other wheeled vehicles supported by metallic rails, of which the following is a specification, reference being had to the accompanying drawings and to the numerals of reference marked thereon.

My invention has for its object to provide, in connection with an electromagnetic traction-increasing apparatus, a system of braking rendered operative by the magnetization of the wheels of the car, whereby the brake is practically automatic in its action.

In carrying out my invention I employ, in connection with the frame or truck of the car, any ordinary system of leverage, brake-shoes, brake-beams, and the like, together with the ordinary hand winding devices, or, as their equivalent, any power device may be employed, operated by steam, air, vacuum, or other agency. In will be understood that the hand or power actuating devices are mainly employed to the extent only of moving the brake-shoes into the magnetic field of the wheels, so that said shoes may be attracted by the magnetism of the wheels and actuated by a power consequent upon the magnetization added to that applied manually or otherwise. In throwing off brakes it is only necessary to release the strain exerted by such devices, first demagnetizing the wheels by any suitable switch or other arrangement, whereupon the brakes will be automatically withdrawn from the wheels by springs attached to the brake-beam.

In the further description of my invention which follows reference is made to the accompanying drawings, in which—

Figure 1:
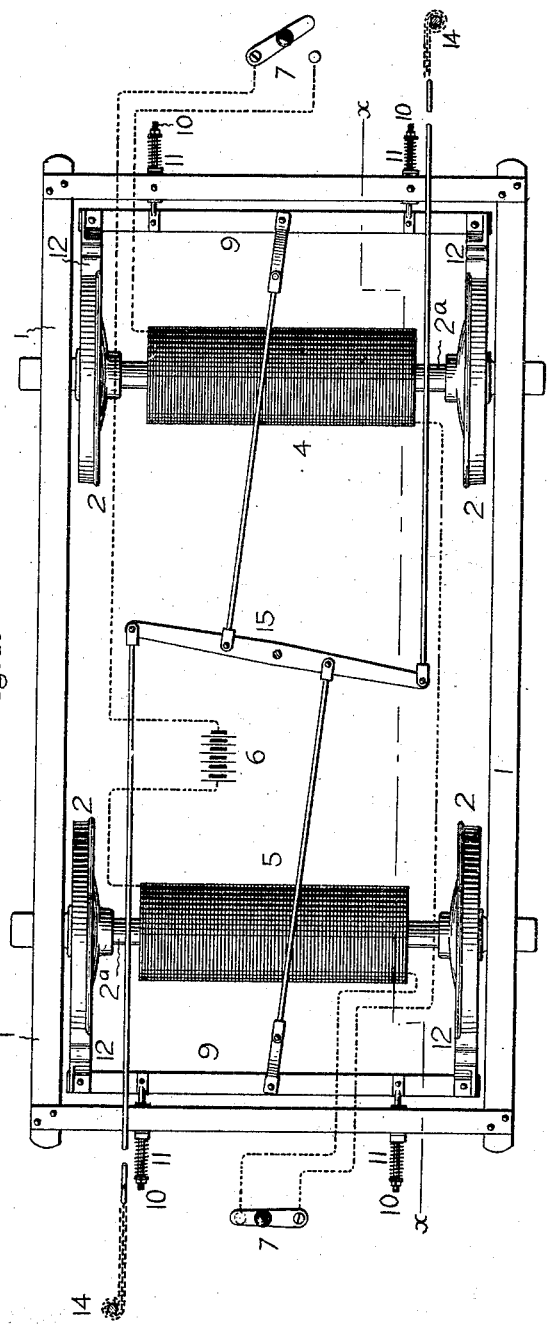
Figure 2:
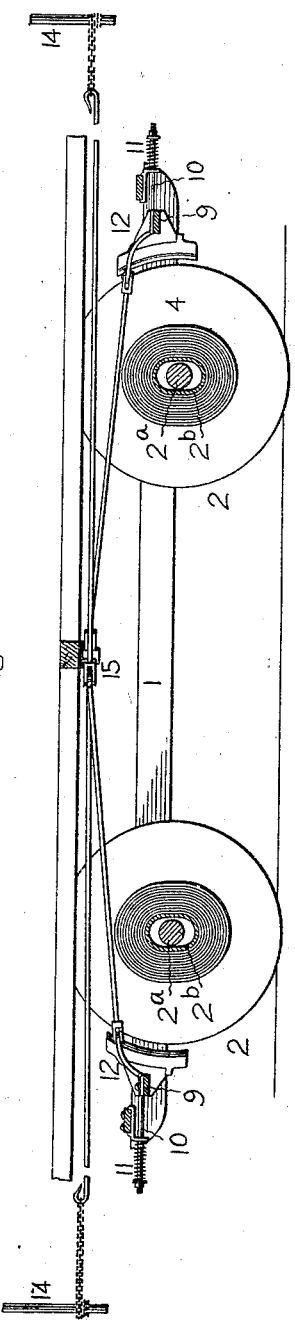

Figure 1 is a plan view of so much of the frame and trucks of an ordinary street-car as is sufficient to illustrate my invention. Fig. 2 is a sectional elevation upon the line $x\,x$ of Fig. 1.

Similar numerals of reference indicate similar parts in the respective figures.

Let 1 1 represent the main portions of the framework of a street-car to which my invention is shown applied, although it is equally adaptable to railway-cars, other cars of different types, locomotives, &c.

2 2 indicate the wheels, which are suitably mounted upon axles $2^a$, provided with bearing-boxes. (Not here shown.)

$2^b$ represents a sleeve of elongated shape in cross-section mounted upon each axle $2^a$, substantially as shown in an application filed by me November 20, 1900, Serial No. 37,168. The sleeve, however, may in other forms of my invention be circular in cross-section, which arrangement would apply to different forms of truck.

4 and 5 represent magnets or helices, each being mounted upon the sleeve $2^b$ of one of the axles. Wires are shown in dotted lines, by means of which the two magnets 4 and 5 are connected in a common circuit. A battery or generator is indicated by 6, and switches 7 7 are shown at the respective ends of the car, by means of either of which the helices 4 and 5 may be deënergized.

The braking mechanism shown is of ordinary character, except as to the following particulars:

As the braking mechanisms at both ends of the car are alike in all respects a description of one set will be sufficient, and the same numerals of reference are applied to the parts at each end of the car.

Referring to the right-hand side of Fig. 1, 9 is a brake-beam of magnetizable metal connected with the end sill of the car-frame by means of slide bolts or rods 10, around each of which is coiled a spiral spring 11, which is confined between washers, the outer washers being held by nuts, all as clearly shown. The brake-beam 9 is therefore capable of a sliding movement in the direction of the length of the car and toward and from the peripheries of the adjacent wheels. To each end of the brake-beam 9 is attached a brake-shoe 12, of any ordinary or approved description. As shown in the figures, the brakes are thrown off or unapplied. It being understood that the wheels of the car have been magnetized and it is desired to set the brakes, the operator (if hand-power is used) will revolve the brake-staff 14 in the proper direction, drawing upon the central transverse lever 15, to which at opposite sides of its pivot are attached rods, as shown, connecting with the brake-beams. The rods and lever 15 are insulated from magnetic action. The brakes at each end of the car are thus simultaneously applied whichever of the two staffs is operated, and the brake-shoes having been brought into the field of magnetic influence they will be at once attracted to the wheels, thus performing a braking action in addition to that obtained by the manual or other power applied for drawing the brake-shoes against the peripheries of the wheels. As shown in Fig. 1, the switch 7 at the right is open; but it will be understood that during the magnetization of the wheels both switches will necessarily be closed. For relieving the brakes the wheels must first be demagnetized, which is done by opening one of the switches 7, whereupon the ratchet of the brake-staff having been released from the ordinary dog or detent the springs 11, drawing upon the brake-beam 9, will at once detach the shoes from the wheels, in which position they will be held until a repetition of the braking action is desired.

Changes in construction and arrangement may be made in this apparatus without departing from the spirit of my improvement, and such changes or deviations as may suggest themselves to the skilled mechanic without exercising the faculty of invention are considered by me to be within the scope of my claims.

Having thus described my invention, I claim—

1. In an electromagnetic brake for a car, locomotive, or other wheeled vehicle adapted to be supported by metallic rails, the combination with wheels adapted to be magnetized and deënergized, a brake-beam of magnetizable metal for each pair of wheels, shoes mounted upon each of said beams, independent means for drawing or moving the brake beams and shoes into or within the magnetic influence of the wheels, and independent means for drawing said shoes from contact with and out of the magnetic influence of said wheels upon the demagnetization of the latter, substantially as set forth.

2. In an electromagnetic brake for a car, locomotive, or other wheeled vehicle adapted to be supported by metallic rails, the combination with wheels adapted to be magnetized and deënergized, a brake-beam of magnetizable metal for each pair of wheels, slide bolts or rods for connecting each of said brake-beams with the frame of the car, upon which rods the beam is capable of a sliding movement, shoes mounted upon each of said beams, means for mechanically forcing or moving the shoes into or within the magnetic influence of the wheels, and means for automatically withdrawing said shoes from contact with and out of the magnetic influence of said wheels upon the demagnetization of the latter, substantially as set forth.

In testimony whereof I hereunto set my hand.

ALBERT A. HONEY.

Witnesses:
 GEO. H. HOWARD,
 C. B. BULL.